United States Patent [19]

Haigler

[11] Patent Number: 4,951,991
[45] Date of Patent: Aug. 28, 1990

[54] TELESCOPING TRUCK BED EXTENSION

[75] Inventor: Dale C. Haigler, Benton Harbor, Mich.

[73] Assignee: Load Helper, Inc., Benton Harbor, Mich.

[21] Appl. No.: 242,047

[22] Filed: Sep. 8, 1988

[51] Int. Cl.⁵ .............................................. B62D 33/08
[52] U.S. Cl. ....................................................... 296/26
[58] Field of Search .......................... 296/165, 26, 7, 3; 224/42.41, 42.44

[56] References Cited

U.S. PATENT DOCUMENTS

| | | | |
|---|---|---|---|
| 2,442,889 | 6/1948 | Deal | 296/26 X |
| 2,468,579 | 4/1949 | Vuori | 296/26 |
| 2,547,083 | 4/1951 | Lundgren | 224/42.44 X |
| 2,729,499 | 1/1956 | Eggum | 296/26 |
| 3,528,578 | 9/1970 | Schoenberger | 224/42.44 X |
| 4,475,760 | 10/1984 | Morgan | 296/26 |

Primary Examiner—Margaret A. Focarino
Assistant Examiner—Joseph D. Pape
Attorney, Agent, or Firm—Todd A. Dawson

[57] ABSTRACT

A telescoping vehicle bed extension which is connected to the frame of the vehicle. The extension when retracted, is positioned substantially under the vehicle bed. Upon extension, a vertical support member is connected to the telescoping extensions to support the load end extending past the vehicle bed. When retracted, the vertical support is carried by the extensions in a substantially horizontal position.

1 Claim, 3 Drawing Sheets

TELESCOPING TRUCK BED EXTENSION

SUMMARY OF THE INVENTION

This invention relates to an extendable support and will have specific application to an expandable support attached to a vehicle.

Heretofore, a load substantially longer than a truck bed such as carpeting or beams would extend past the end of the truck which often required that a weight be placed on the inward end to prevent the items from pivoting over the truck tail gate and falling out of the bed. Such a situation is dangerous to both person and property.

One previous solution to this problem consisted of a rigid plate substantially conforming to the truck bed floor and rollable on a pair of tracks. The entire plate was shifted or extended on the tracks to extend the effective length of the bed. Another attempt to solve the problem included a pair of supports vertically extending from the bed and a longitudinal extension wherein the longitudinal extension is supported by cables strung over the vertical supports in a suspension bridge type configuration. One problem associated with the above bed extension devices is that when not in use, a portion of the bed space is used by the device. Further, each prior bed extension is complicated in nature requiring alignment of tracks or support cabling.

The extendable support of this invention eliminates problems experienced with prior bed extensions by providing a telescoping support which when not in use is housed under the truck bed. An upright support member is provided which when not in use is positionable substantially horizontal to slide with the telescoping support under the truck bed.

Accordingly, it is an object of this invention to provide for a truck bed extension which is housed beneath the truck bed when not in use.

A further object of this invention is to provide for an economical truck bed extension.

Another object of this invention is to provide for a truck bed extension that is easy to operate and install.

Further objects of this invention will become apparent upon a reading of the following description.

DESCRIPTION OF THE PREFERRED EMBODIMENT

The preferred embodiment herein disclosed is not intended to be exhaustive or to limit the invention to the precise form disclosed. Rather it is chosen to enable others skilled in the art to utilize its teachings.

Figure 1:
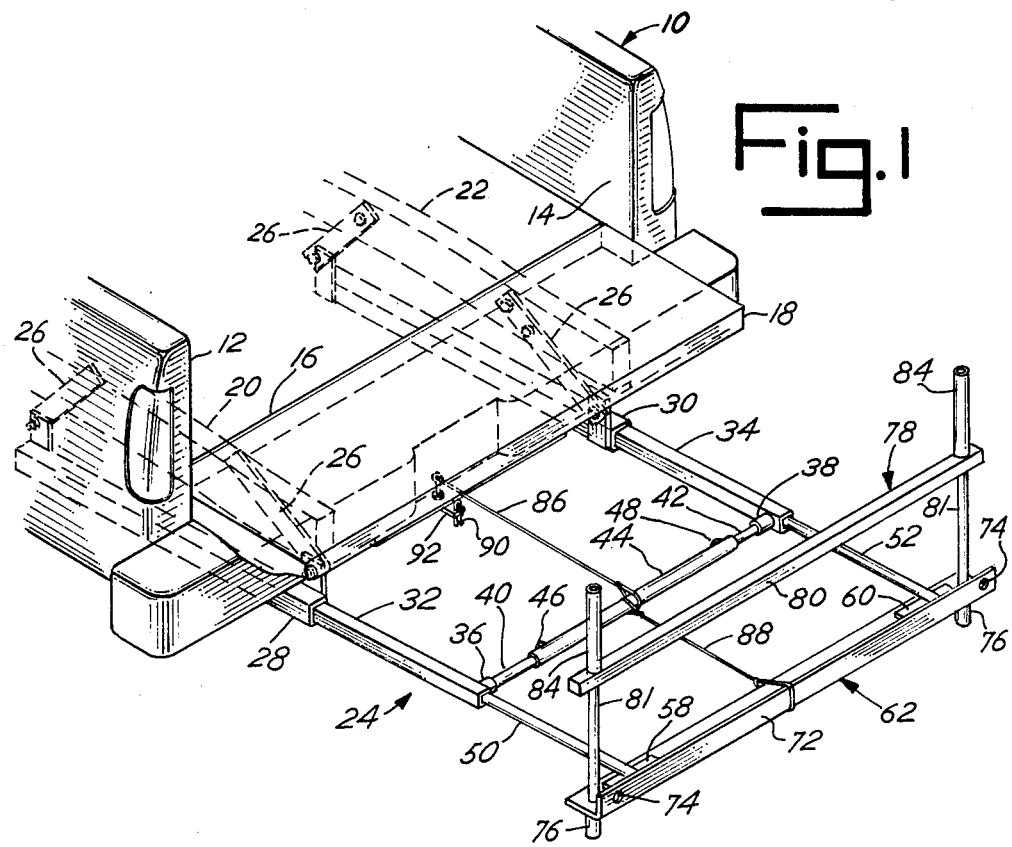
FIG. 1 is a perspective view of the bed extension shown in its environment in the extended position.

Referring now to the figures, FIG. 1 illustrates a pick up truck bed 10 having side walls 12, 14 and floor 16. A hinged gate 18 is connected to floor 16 between side walls 12, 14. Truck bed 10 is supported in part by longitudinal frame members 20, 22 as illustrated in FIG. 1. Truck bed 10 is used for illustration only and does not constitute a part of this invention.

Bed extension 24, as illustrated in the figures, includes tubes 28, 30 which are connected to truck frame members 20, 22 by metal straps 26 in the manner illustrated in FIG. 1. Tubes 32, 34 are telescopically carried in tubes 28, 30 respectively and include opposing cylindrical sleeves 36, 38. Rods 40, 42 are positioned in and supported by sleeves 36, 38 with the opposite ends carried within tube 44. Bolts 46, 48 extend through the side wall of the tube 44 and contact rods 40, 42 to secure the rods within tube 44. A pair of extension rods 50, 52 are telescopically carried in tubes 32, 34 and are attached to plates 58, 60. Plates 58, 60 are connected to L-bracket 62 by bolts 64 and nuts 66. Bolts 64 pass through elongated slots 68, 70 in L-bracket 62. L-bracket 62 includes wells 76 which are aligned with holes 78 positioned near each end of the L-bracket. L-bracket 62 includes upright wall 72 which has a hole 74 positioned near each end thereof.

Bed extension 24 also includes detachable vertical support member 78. Support 78 includes a generally horizontal cross bar 80 having a leg 81 located near each end of the bar. Each leg 81 includes a threaded end 82 which extends a small distance above bar 80. Posts 84 may be threaded onto leg ends 82.

A cable 86 is connected between truck bed 10 and adjustment tube 44 to limit its outward movement. Similarly, a cable 88 is connected between tube 44 and cross member 62 to define the outward limit of extension rods 50, 52 relative to tubes 32, 34.

Figure 2:
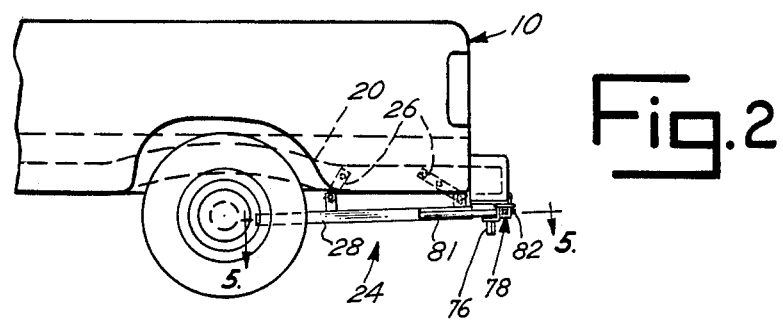
FIG. 2 is an elevational view of the bed extension shown in its environment in the retracted position.
Figure 5:
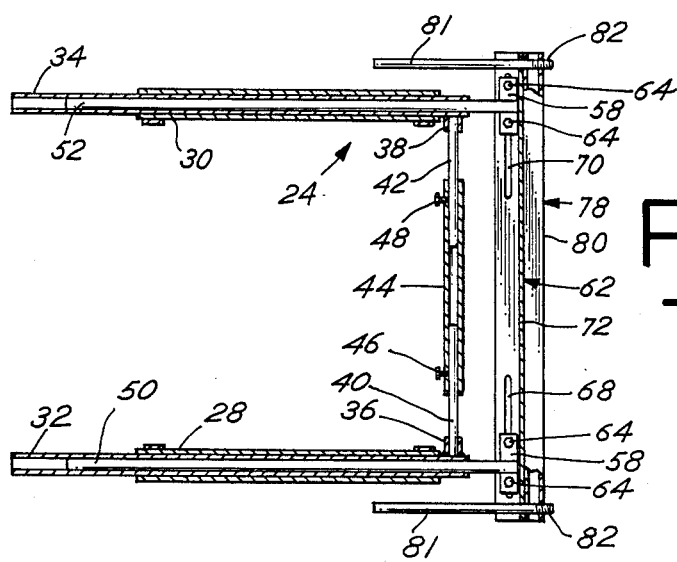
FIG. 5 is a sectional view taken along line 5—5 of FIG. 2.

The truck bed extension is typically in the retracted position as illustrated in FIGS. 2 and 5 when not in use. So positioned, tubes 32, 34 are substantially housed within tubes 28, 30. Rods 50, 52 are likewise substantially carried within tubes 32, 34. Sleeves 36, 38 abut the end of tubes 28, 30 to define the retracted position of tubes 32, 34. Likewise, L-bracket 62 abuts tubes 32, 34 to define the retracted position of bars 50, 52. When not in use, legs 81 of support 78 are positioned within holes 74 of bracket 72 to position and carry support 78 in a substantially horizontal position as seen in FIG. 5. To retain extension 24 in its retracted position, a cotter pin 90 may extend through a bracket 92 connected to the truck bed as illustrated in FIG. 2.

Figure 3:
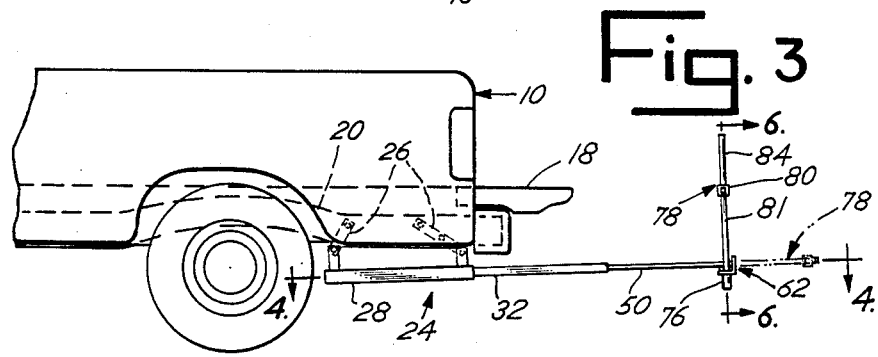
FIG. 3 is an elevational view of the bed extension shown in its environment in the extended position.
Figure 4:
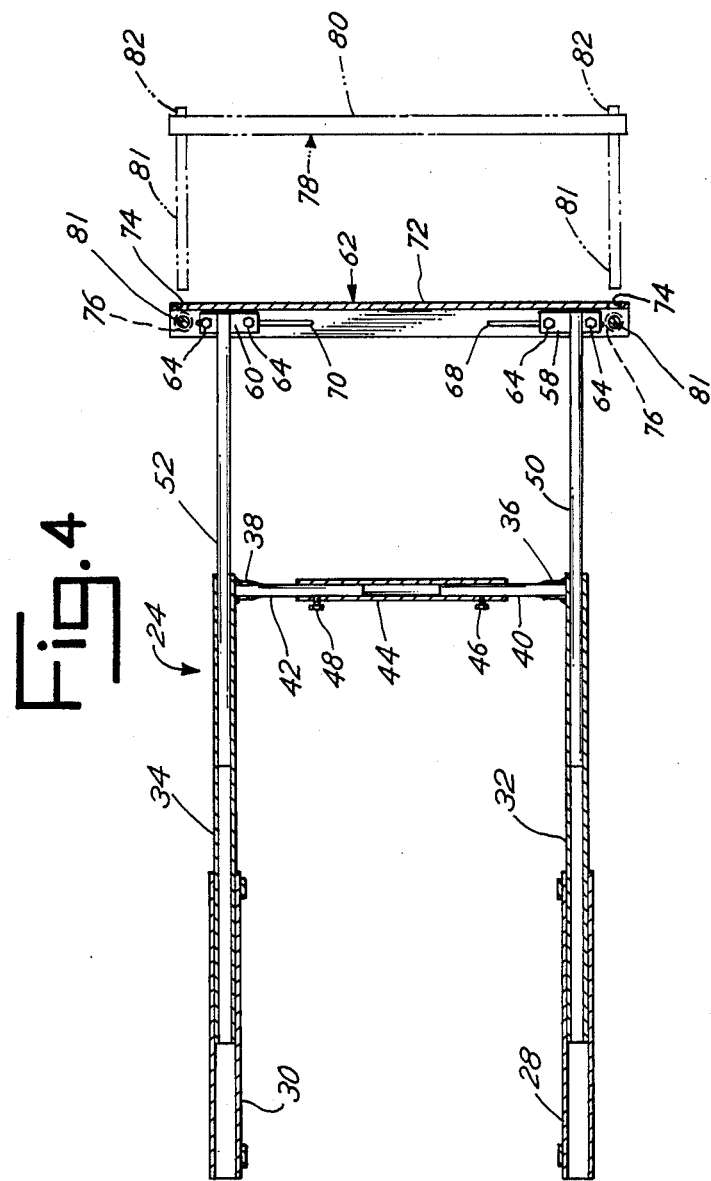
FIG. 4 is a sectional view taken along line 4—4 of FIG. 3.
Figure 6:
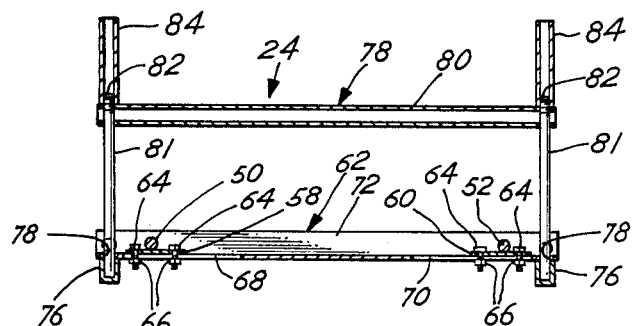
FIG. 6 is a sectional view taken along line 6—6 of FIG. 3.

To extend bed extension 24, pin 90 is first pulled from bracket 92. The user then pulls on cross member 62 to telescope outwardly rods 50, 52 and tubes 32, 34. Such tubes extend until their outer limit as defined by cables 86, 88 is met. Next, the user removes vertical support 78 from holes 74 and places each leg 81 downwardly into wells 76. Legs 81 and wells 76 serve to maintain support 78 in the substantially vertical orientation of FIGS. 1, 3 and 6. After support 78 is positioned post 84 may be screwed onto the threaded ends 82 of legs 81. Posts 84 define the limits of horizontal movement of a load positioned therebetween.

To accommodate a variety of truck frame widths extension 24 is made adjustable by loosening bolts 46, 48 of tube 44 and bolts 64 of plates 58 and 60. Upon the above identified bolts being loosened, the telescope supports may be moved inwardly thereby urging rods 40, 42 inward and sliding brackets 58, 60 along slots 68, 70. So adjusted the bolts may be retightened.

It should be understood that in the preferred embodiment extension 24 is oriented at an approximate 5° relative to the horizontal.

It should be further understood that the invention is not to be limited to the precise form disclosed but may be modified within the scope of the appended claims.

I claim:

1. A device adapted for connection to a vehicle having a bed means for carrying elongated objects said bed means having an effective length, said device connected to said vehicle constituting means for extending the effective length of said bed means, said device including a frame connected to said vehicle and being slidable between a retracted storage position beneath the bed means and an extended position extending longitudinally of the bed means, support means detachably connected to said frame and positioned in a substantially vertical support position when the frame is in its extended position, said frame includes spaced support tubes connected to said vehicle, a pair of spaced telescoping supports carried in said support tubes and interconnected by a cross member, said cross member including well means for supporting said support means in its said substantially vertical support position, said support means including spaced legs oriented generally perpendicular to said cross member, said legs positioned in said well means when said vertical support means is in its said substantially vertical support position, said cross member further defines holes, said holes for accommodating said legs of said support means in a generally horizontal position when said tubular frame is in its retracted storage position.

* * * * *